United States Patent [19]

Hotomi et al.

[11] Patent Number: 5,159,351
[45] Date of Patent: Oct. 27, 1992

[54] LIGHT DEFLECTING DEVICE

[75] Inventors: Hideo Hotomi; Keiji Okuda, both of Osaka, Japan

[73] Assignee: Minolta Camera Co., Ltd., Osaka, Japan

[21] Appl. No.: 651,101

[22] Filed: Feb. 4, 1991

Related U.S. Application Data

[63] Continuation of Ser. No. 511,832, Apr. 13, 1990, abandoned, which is a continuation of Ser. No. 353,886, May 18, 1989, abandoned.

[30] Foreign Application Priority Data

May 20, 1988 [JP] Japan ................. 63-124383
May 20, 1988 [JP] Japan ................. 63-124384

[51] Int. Cl.$^5$ .............................................. H04H 1/21
[52] U.S. Cl. ........................ 346/108; 359/245; 359/87; 359/315
[58] Field of Search ............... 346/108, 76 L, 107 R, 346/160; 359/245, 87, 315

[56] References Cited

U.S. PATENT DOCUMENTS

| | | | |
|---|---|---|---|
| 3,691,484 | 9/1972 | Dore | 359/259 |
| 4,343,536 | 8/1982 | Watanabe et al. | 350/355 |
| 4,396,246 | 8/1983 | Holman | 359/245 |
| 4,523,803 | 6/1985 | Arao et al. | 350/96.13 |
| 4,614,408 | 9/1986 | Mir et al. | 350/96.14 |

FOREIGN PATENT DOCUMENTS 57-153211 9/1982 Japan .
63-100423 5/1988 Japan .

OTHER PUBLICATIONS

Nikkei Electronics, Oct. 13, 1980, pp. 138-159 With Translation.
Kitanmo U.S. Appl. No. 108,588, Oct. 4, 1987.

*Primary Examiner*—Mark J. Reinhart
*Attorney, Agent, or Firm*—Price, Gess & Ubell

[57] ABSTRACT

A light deflecting device comprising a transparent member having an electro-optical effect, and a first and a second electrode provided on opposite surfaces of the transparent member. When a voltage is applied to one of the electrodes, an uneven electric field is formed inside the transparent member.

This uneven electric field varies a refractive index distribution through the transparent member. As a result, light entering the transparent member is deflected inside the transparent member. This light deflecting device may be used in an optical printing head, a rangefinder or a color checker.

17 Claims, 10 Drawing Sheets

LIGHT DEFLECTING DEVICE

This is a continuation of application serial No. 511.832, filed on Apr. 13, 1990, for a LIGHT DEFLECTING DEVICE (amended to ELECTRO-OPTIC DEFLECTION FROM ELECTRIC FIELD VARIANCE) now abandoned which is a continuation of U.S. Ser. No. 353,886, filed on May 18, 1989 (abandoned).

FIELD OF THE INVENTION

The present invention relates to a device for deflecting light by applying an electric field to a material having an electro-optical effect. More particularly, the invention relates to a device for deflecting light by forming an electric field which is uneven in a direction perpendicular to a direction of light incidence.

DESCRIPTION OF THE RELATED ART

Figure 15:
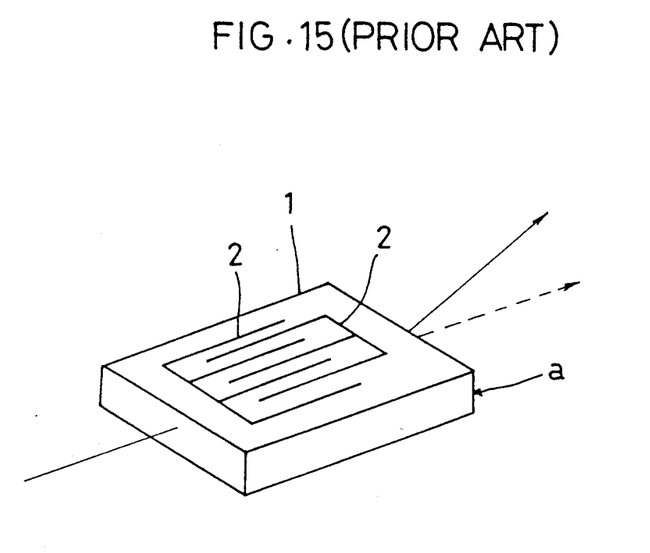
FIG. 15 is a perspective view of a known prior art light deflecting device.

The refractive index of a material having an electro-optical effect, such as PLZT, is known to vary with the intensity of an electric field applied thereto. "Nikkei Electronics", Oct. 13, 1980, pages 138–159, discloses a light deflecting device for deflecting incident light by utilizing this property of the material. As shown in FIG. 15, the light deflecting device disclosed in the above publication includes a transparent electro-optical material 1 and a pair of comb-shaped electrodes 2 formed on a surface thereof. A voltage applied between the electrodes 2 forms an electric field progressively attenuating away from the surface on which the electrodes 2 are formed. This electric field is utilized to vary the refractive index inside the material 1. Light entering the material is thus deflected in accordance with the distribution of refractive index variation. The above publication further discloses a different type deflecting device which comprises a triangular prism and electrodes formed on opposite triangular ends thereof. A voltage is applied between the electrodes to deflect incident light at various angles.

The two devices disclosed in the above publication, however, have the disadvantage of requiring that a very high voltage be applied for sufficiently deflecting the light.

SUMMARY OF THE INVENTION

A primary object of the present invention, therefore, is to provide a light deflecting device capable of sufficiently deflecting light with application of a reduced voltage.

Another object of the present invention is to provide a light deflecting device that has a simple construction and is easy to manufacture.

A further object of the present invention is to provide an optical printer utilizing a light deflecting device.

These and other objects are fulfilled, according to the present invention, by a light deflecting device comprising a transparent member having an electro-optical effect; and electric field generating means provided on opposite parallel surfaces of the transparent member for generating an electric field inside the transparent member, the electric field varying in a direction parallel to the surfaces; wherein the electric field generated by the electric field generating means varies a refractive index distribution inside the transparent member, thereby causing light entering the transparent member to be deflected inside the transparent member.

The electric field generating means may include a first and a second electrodes parallel and opposed to each other across a path of transmission of incident light through the transparent member. The first electrode may be formed of a resistor applicable with the voltage at one end thereof and grounded at the other end, and the second electrode may be formed of a good conductor grounded.

A light deflecting device according to the present invention may comprise a transparent member having an electro-optical effect, and electric field generating means provided on opposite non-parallel surfaces of the transparent member. The electric field generating means generates an electric field inside the transparent member, the electric field varying with a distance variation between the non-parallel surfaces.

In the above construction, the electric field is intense where the electrodes are close together, and attenuates progressively as the electrodes become wide apart. This uneven electric field produces a refractive index distribution through the transparent electro-optical member for deflecting the incident light.

Preferably, the electrode means includes a first and a second electrodes opposed to each other across a path of transmission of incident light through the transparent member. The first and second electrodes comprise good conductor, the first electrode being connected to a power source, and the second electrode being grounded.

Consequently, the present invention produces the refractive index distribution in the transparent member with a low voltage for sufficiently deflecting the light. The voltage required for this purpose is lower in the present invention than in the prior art in which the voltage is applied between the pair of comb-shaped electrode mounted on a surface of a plate-shaped transparent electro-optical member for forming an uneven electric field to produce a refractive index distribution.

Further, various advantages may be realized by applying the light deflecting device according to the present invention to an optical printer for forming an image on a photoreceptor by selectively projecting light onto the photoreceptor. In this construction, the light deflecting device for selectively deflecting light from a light source includes a transparent member having an electro-optical effect, and electrode means for generating an uneven electric field inside the transparent member thereby to vary a refractive index distribution inside the transparent member. The image is formed on the photoreceptor by applying to the electrode means an electric signal corresponding to the image to be recorded, to selectively deflect light.

In the optical printer, or an optical printing head thereof, a light shutter array formed of the transparent member having an electro-optical effect is used for producing an uneven electric field to deflect the optical path of incident light. The light shutter array provided by the present invention does not require precision cutting to deep positions of each light shutter by means of a dicing saw or the like, in order to reduce the voltage applied to each light shutter, as practiced in the prior art in manufacturing a shutter array for shutting off the light by polarizing and turning the light.

With the present invention, there is no possibility of impairing yield by damaging the shutters in the course of cutting work as in the prior art. Also there is no possibility of deteriorating image contrast by light leakage occurring even when the electric field is not formed, which is due to distortions of edges of the light shutters made by the cutting work.

Further, the optical printing head according to the present invention does not require a polarizer or an analyzer for turning each shutter of the light shutter array on and off. This feature not only reduces the cost of the printing head, but realizes excellent image contrast since light is guided to the light shutter array without passing the light through a polarizer thereby guiding a large amount of light to each light shutter.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Light deflecting devices embodying the present invention will particularly be described hereinafter with reference to the drawings.

First Embodiment

Figure 1:
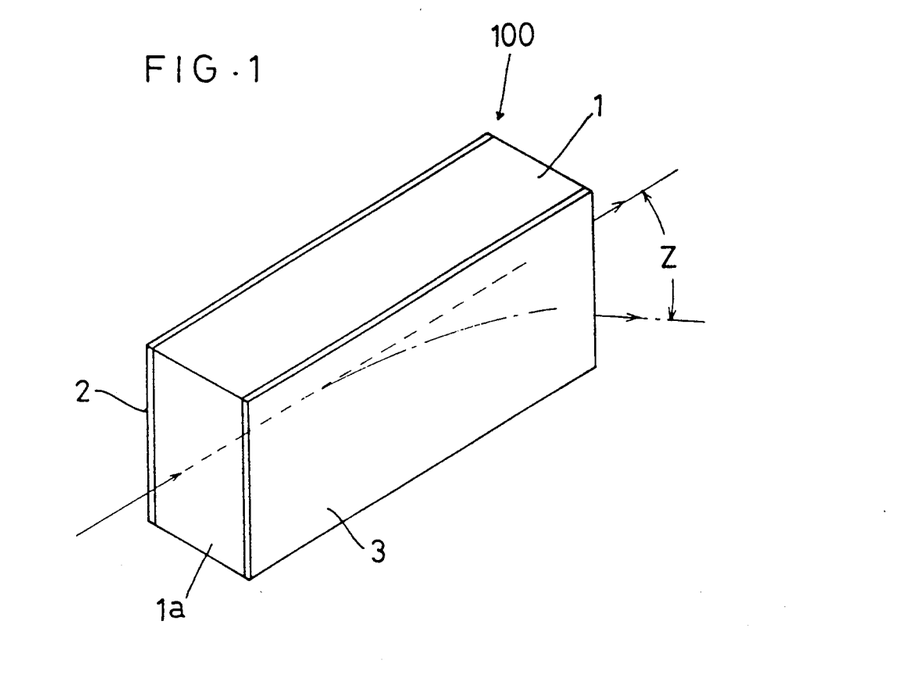
FIG. 1 is a perspective view of a light deflecting device according to a first embodiment of the present invention.
Figure 2:
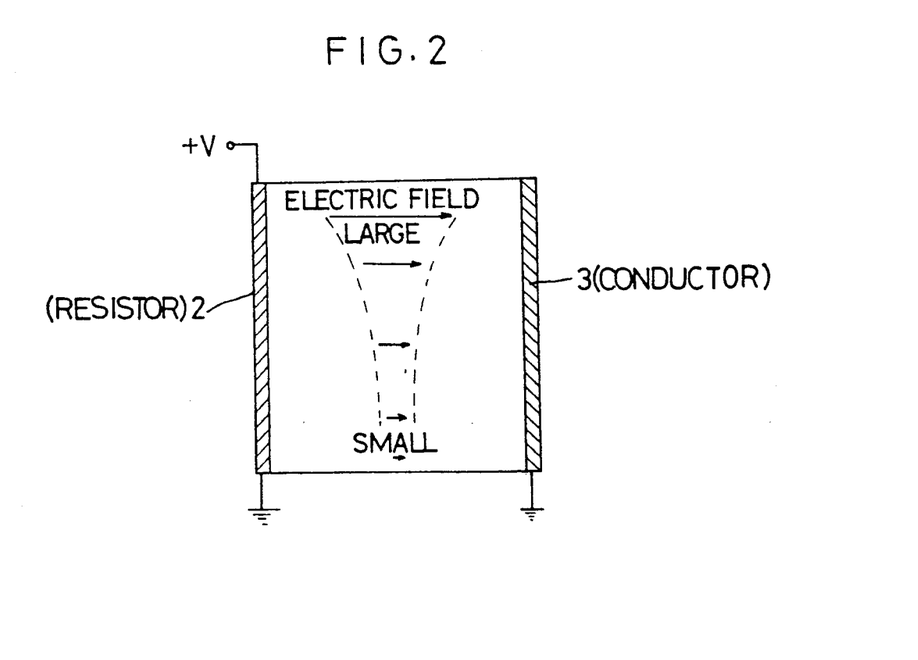
FIG. 2 is a view in vertical section of the light deflecting device.

A light deflecting device 100 in this embodiment employs PLZT (manufactured by Motorola Inc., 9065) having a composition 9/65/35 as a transparent material having an electro-optical effect. As shown in FIGS. 1 and 2, a transparent electro-optical element 1 is formed of this PLZT into a plate shape, and electrodes 2 and 3 are mounted on opposite surfaces thereof. Light entering the electro-optical element 1 passes between the electrodes 2 and 3.

In this embodiment, at least one of the electrodes 2 has an electric resistance to form an uneven electric field that is not parallel to an axis of incident light. The uneven electric field is applied to the light deflecting device 100.

As seen from FIG. 2, the electrode 2 comprises a resistor with a voltage: +V applied to the top thereof, the bottom of the electrode 2 being grounded. The electrode 3 comprises a good conductor acting as a grounding electrode. With the light deflecting device 100 having this construction, when the voltage is applied to the electrode 2, the electrical potential decreases progressively toward the bottom. Consequently, the electric field formed inside the transparent electro-optical element 1 attenuates toward the bottom. In other words, an uneven electric field is formed inside the electro-optical element 1.

FIG. 2 shows the electric field varying in a continuous manner inside the electro-optical element 1. Alternatively, the electrode 2 may comprise a plurality of segments to which different voltages are applied. This will result an electric field varying in stages inside the electro-optical element 1.

In any case, the uneven electric field forms a refractive index distribution through the electro-optical element 1. The light entering the light deflecting device 100 is deflected toward the bottom where the electric field has a reduced intensity.

The transparent electro-optical element 1 has a light entry surface 1a of 100 micrometers in width and 300 micrometers in height. The incident light is deflected about 2.34 degrees inside the electro-optical element 1 before reaching an exit surface by applying 150 V to the electrode 2. Further, the light is refracted when passing through the exit surface, to form a total deflection angle as large as 5.85 degrees.

A still greater deflection angle Z may be realized by increasing the voltage applied to the electrode 2 or by varying the dimensions of the entry surface 1a.

Second Embodiment

Figure 3:
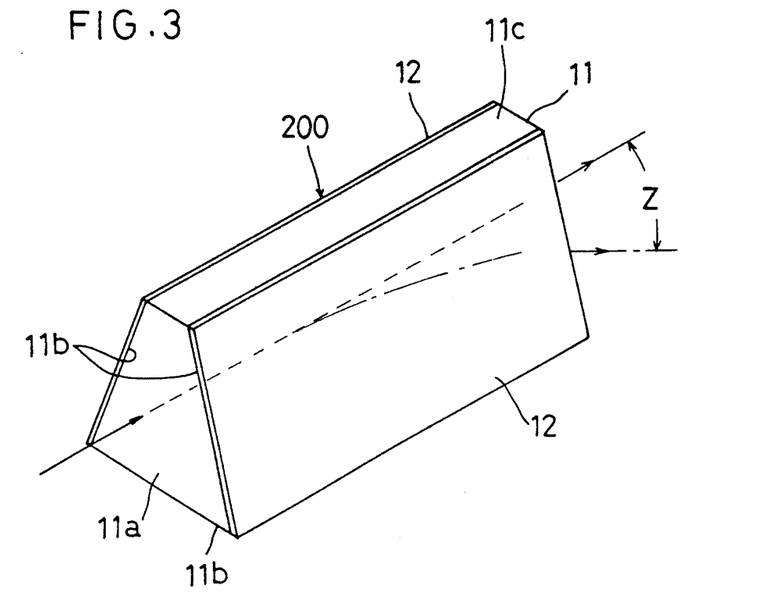
FIG. 3 is a perspective view of a light deflecting device according to a second embodiment of the invention.

As shown in FIG. 3, a light deflecting device 200 in a second embodiment comprises a trapezoidal electro-optical element 11 formed of a transparent material having an electro-optical effect. Electrodes 12 and 13 are mounted on opposite sloping surfaces 11b of the electro-optical element 11. Light enters the electro-optical element 11 at an entry surface 11a, and passes between the electrodes 12 and 13.

In the second embodiment, as distinct from the first embodiment, the electrodes 12 and 13 both comprise good conductors. A voltage +V is applied to one of the electrodes 12 while the other electrode 13 grounded.

With the light deflecting device 200 having this construction, when the voltage is applied between the electrodes 12 and 13, a variation occurs in the electric field formed inside the transparent electro-optical element 11. In other words, the electric field acts intensely on a top position 11c of the electro-optical element 11 where the electrodes 12 and 13 are close to each other. The electric field gradually attenuates toward a bottom position 11d where the electrodes 12 and 13 are wide apart.

This uneven electric field produces a refractive index distribution through the electro-optical element 11. The light entering the light deflecting device 200 is deflected toward the bottom 11d where the electric field has a reduced intensity.

Third Embodiment

Figure 4:
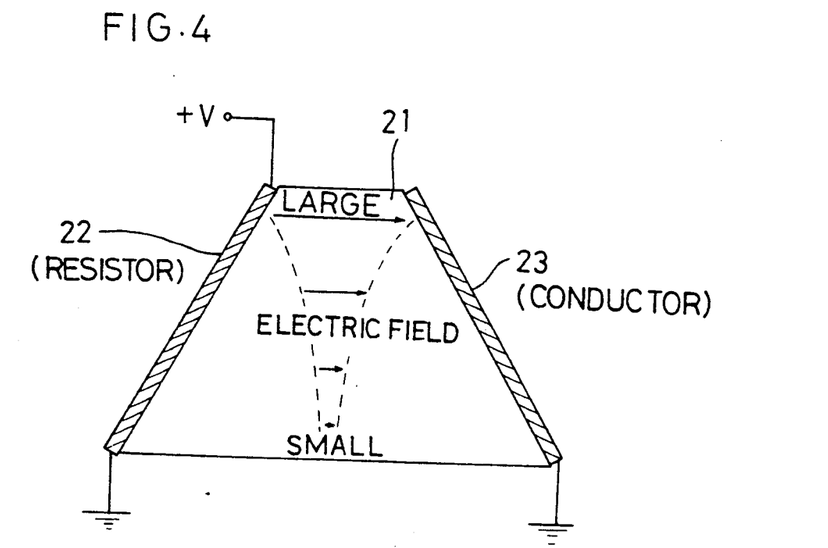
FIG. 4 is a view in vertical section of a light deflecting device according to a third embodiment of the invention.

FIG. 4 shows a light deflecting device 300 which is a combination of the first and second embodiments. More particularly, the light deflecting device 300 comprises a trapezoidal transparent electro-optical element 21 as in the second embodiment, and two electrodes 22 and 23 of which one electrode 22 is a resistor and the other electrode 23 a good conductor as in the first embodiment. When the voltage is applied to the resistor electrode 22, an electric field sharply varying in the vertical direction is formed inside the electro-optical element 21. Consequently, light entering the electro-optical element 21 is deflected to an even greater degree.

A transparent material having a secondary electro-optical effect may be used in the light deflecting devices according to the present invention which utilize a refractive index distribution for deflecting light. Then, the light exiting the light deflecting devices will diverge especially where the deflection angle Z is large.

In order to check the light divergence, it may be desirable to use a transparent material having a primary electro-optical effect or to guide the light through a polarizing plate.

Fourth Embodiment

Figure 5:
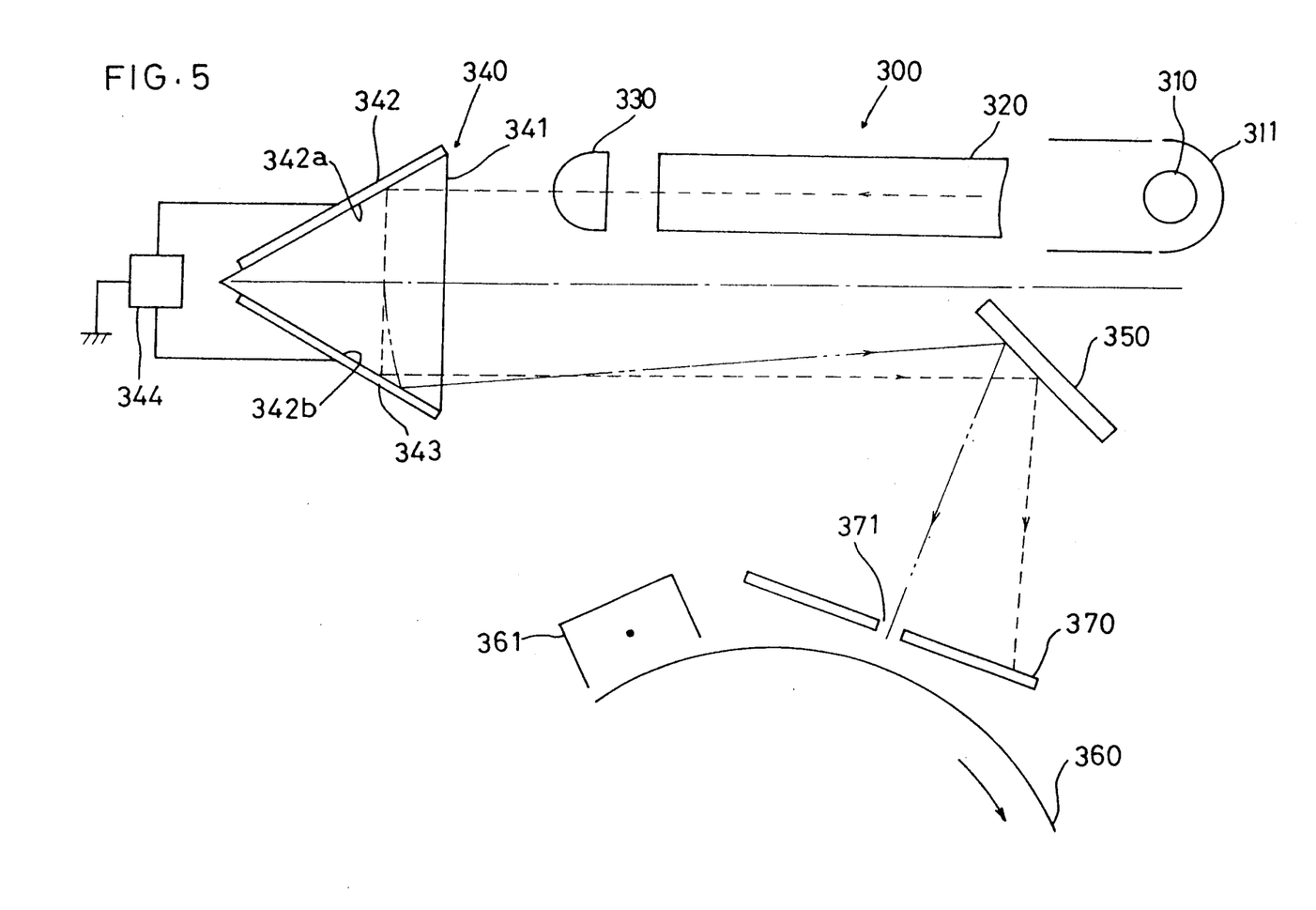
FIG. 5 is a schematic view showing use of an optical printing head according to a fourth embodiment of the invention.

FIG. 5 shows an optical printing head employing a light deflecting device according to the present invention. In this printing head 300, light from a light source 310 is reflected by a reflector 311 so as to travel through an optical fiber array 320 and then through a collimator lens 330. The collimator lens 330 projects the light in parallel rays to a light shutter array 340.

The shutter array 340 comprises shutters 341 each being a triangular prism formed of a transparent material having an electro-optical effect such as PLZT. Electrodes 342 and 343 both comprising good conductors are mounted on two sloping surfaces of the prism except at the apex thereof.

The shutter array 340 is disposed with the apex of each light shutter 341 remote from the collimator lens 330. The light exiting the collimator lens 330 is reflected by one electrode surface 342a and then by the other electrode surface 342b of each shutter 341, whereby the light is directed to a reflecting mirror 350.

With this light shutter array 340, when a voltage is applied between the electrodes 342 and 343, an electric field is formed inside each shutter 341. The electric field acts intensely adjacent the apex where the electrodes 342 and 343 are close to each other, and gradually attenuates away from the apex with the electrodes 342 and 343 becoming wider apart. This uneven electric field produces a refractive index distribution through the shutter 341.

In FIG. 5, the light travels along an optical path indicated by a dotted line when the voltage is not applied between the electrodes 342 and 343 of each light shutter 341. When the voltage is applied, the light reflected by one electrode surface 342a is deflected away from the apex to be reflected at a position of the other electrode surface 342b remote from the apex, whereby the light is directed to a different position on the reflecting mirror 350, as indicated by a solid line periodically broken with a double-dash.

This embodiment includes a light absorbing plate 370 disposed between the reflecting mirror 350 and a photoreceptor 360 and defining a slit 371 for allowing passage of the light. This light absorbing plate 370 is provided to effect ON/OFF operations of the light shutters 341 with the optical path deflection and non-deflection.

Specifically, when the voltage is applied between the electrodes 342 and 343 for deflecting the optical path, the deflected light is reflected by the reflecting mirror 350 and travels through the slit 371 of the light absorbing plate 370 to the photoreceptor 360. In the absence of voltage application, the light reflected by the reflecting mirror 350 is absorbed by the light absorbing plate 370 instead of passing through the slit 371.

Thus, in the optical printing head 300 of this embodiment, the voltage is selectively applied between the electrodes 342 and 343 of a light shutter 341 of the shutter array 340 by applying an electric signal corresponding to an image to be recorded. The light entering this shutter 341 is deflected by the electric field, and the deflected light is reflected by the reflecting mirror 350 for passage through the slit 371 of the light absorbing plate 370. The light having passed through the slit 371 forms an electrostatic latent image on the photoreceptor 360 charged by a charger 361.

In this embodiment, the deflected light is allowed to pass through the slit 371 of the light absorbing plate 370. Alternatively, the non-deflected light may be allowed to pass through the slit 371, with the deflected light absorbed by the light absorbing plate 370. This is achieved by altering the angle of the reflecting mirror 350 and position of the light absorbing plate 370.

Although the light entering each shutter 341 is reflected therein for output according to the above embodiment, a different mode may be employed wherein the light is transmitted through the shutters 341.

Figure 6:
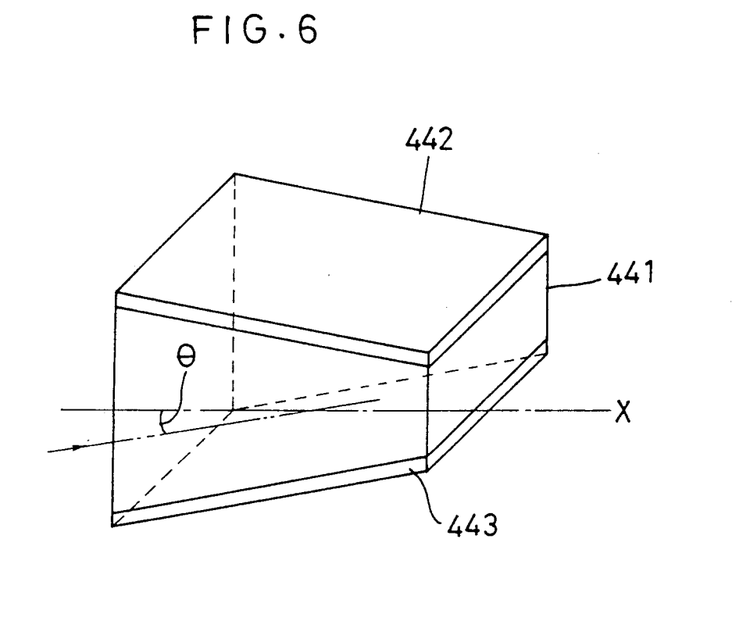
FIG. 6 is a perspective view of a light shutter usable in the optical printing head shown in FIG. 5.

As shown in FIG. 6, for example, each light shutter 441 may have a trapezoidal section, with electrodes 442 and 443 having a good conductance formed on opposite sloping surfaces thereof. In this case, light enters the shutter 441 at a broad bottom with an angle —$\theta$— to the centerline X, and exits the shutter 441 at a narrow top thereof.

An electric field is formed when a voltage is applied between the electrodes 442 and 443 of this shutter 441. This electric field is intense adjacent the top where the electrodes 442 and 443 are close to each other, and gradually attenuates toward the bottom where the electrodes 442 and 443 are wide apart. The uneven electric field results in a refractive index distribution through the shutter 441 for deflecting the optical path.

Fifth Embodiment

Figure 7:
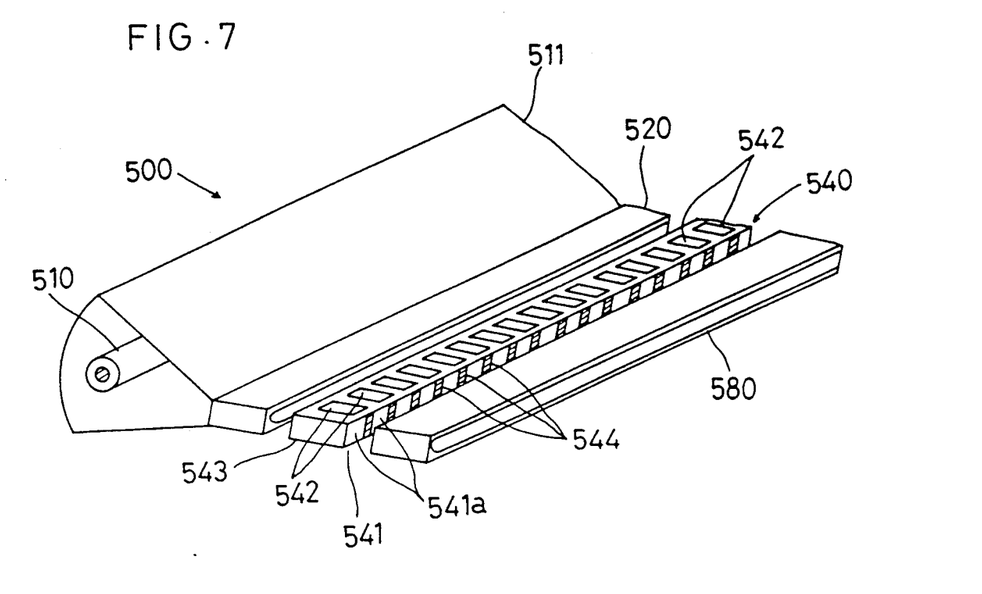
FIG. 7 is a schematic perspective view of an optical printing head according to a fifth embodiment of the invention.

FIG. 7 shows an optical printing head 500 in which light from a light source 510 is reflected by a reflector 511 to travel through an optical fiber array 520 to a light shutter array 540.

The shutter array 540 comprises an elongate plate formed of a transparent material having an electro-optical effect such as PLZT. A plurality of electrodes 542 and 543 are arranged at appropriate intervals along upper and lower surfaces of the plate, so as to sandwich light transmitted through the optical fiber array 520. A pair of upper and lower electrodes 542 and 543 constitutes a single light shutter 541. Each light shutter 541 has a light absorbing layer 544 formed on part of an exit surface 541a.

At least one of the electrodes 542, 543 in each light shutter 541 has an uneven resistance varying in a direction not parallel to an optical axis for forming an uneven electric field in the shutter 541.

Figure 8:
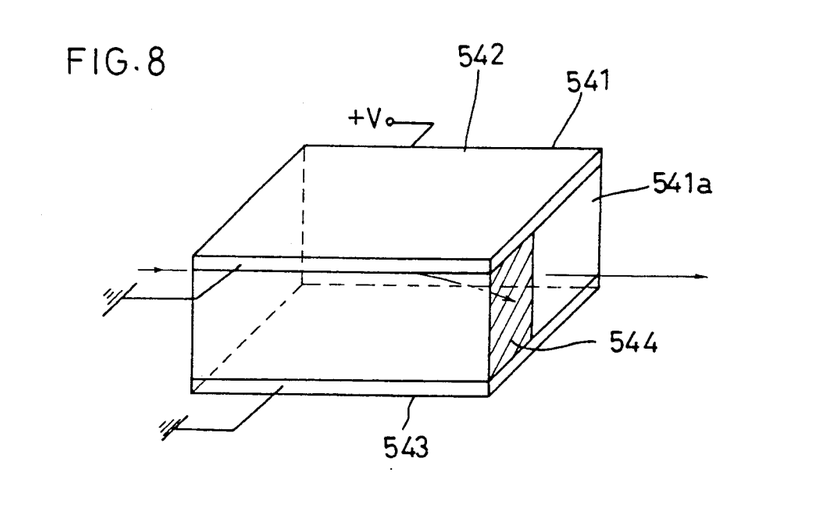
FIG. 8 is a perspective view showing the function of a light shutter used in the fifth embodiment.

FIG. 8 shows one of the light shutters 541 to which the following description refers. The electrode 542 of this light shutter 541 comprises a resistor as in the first embodiment.

When the voltage is applied to the light shutter 541, an electric field is formed inside the shutter 541. With a function similar to that described with reference to FIG. 2, the electric field is weak adjacent a near end of the shutter 541, and gradually intensifies toward the deep end. This uneven electric field produces a refractive index distribution through the shutter 541.

The light entering the light shutter 541 to which the voltage is applied as above travels along an optical path deflected toward the near end as indicated by a dashed line in FIG. 8. The light is then absorbed by the light absorbing layer 544 disposed on the exit surface 541a instead of passing through the light shutter 541. When the voltage is not applied, the light entering the light shutter 541 exits through the exit surface 541a without being deflected as shown by a solid line in FIG. 8.

The optical printing head 500 of this embodiment effects ON/OFF operations of the light shutter 541 by either applying the voltage to the shutter 541 to deflect the optical path or by not applying the voltage. When the voltage is applied, the deflected light is absorbed by the light absorbing layer 544 disposed on the exit surface 541a. In the absence of voltage application, the light proceeds unobstructed out of the shutter 541.

The light exiting the light shutter 541 with no voltage applied thereto travels through a fiber lens array 580 to a photoreceptor for forming an electrostatic latent image thereon.

Sixth Embodiment

Figure 9:
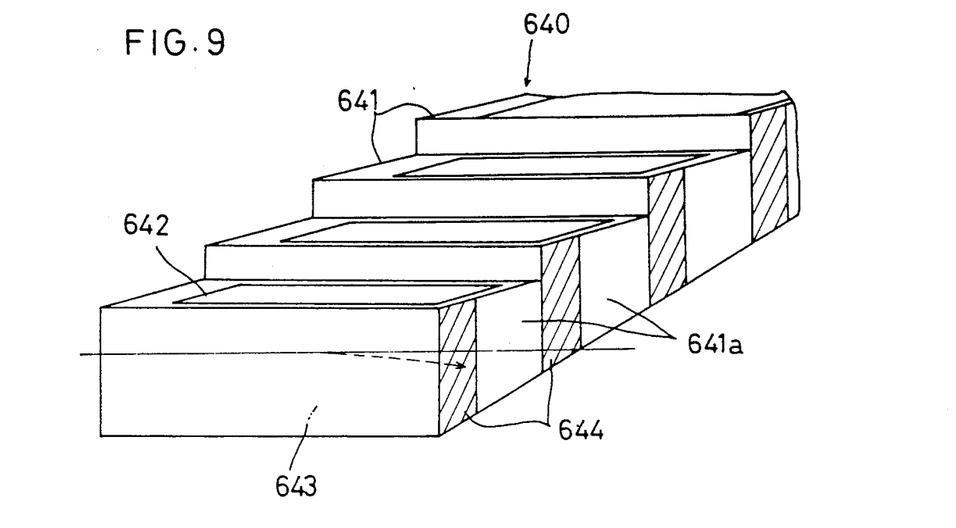
FIGS. 9 and 10 are perspective views showing part of light shutter arrays according to a sixth and a seventh embodiments of the invention, respectively.

FIG. 9 shows a shutter array 640 comprising an elongate plate formed of a transparent material having an electro-optical effect such as PLZT, the plate defining a serrated top. A plurality of electrodes 642 and 643 having a good conductance are arranged on the inclined upper surfaces and opposite lower surfaces. A pair of upper and lower electrodes 642 and 643 constitute a single light shutter 641. Each light shutter 641 has a light absorbing layer 644 formed on the part of an exit surface 641a where the electrodes 642 and 643 are wide apart.

When a voltage is applied between the electrodes 642 and 643 of the light shutter 641, an electric field is formed inside the light shutter 641. This electric field progressively attenuates from the position where the electrodes 642 and 643 are close together to the position where the electrodes 642 and 643 are wide apart. This uneven electric field produces a refractive index distribution through the shutter 641. The light entering the light shutter 64 is deflected, as shown in a broken line in FIG. 9, toward the position of weaker electric field with the electrodes 642 and 643 wide apart. The light is then absorbed by the light absorbing layer 644 disposed on the exit surface 641a.

Seventh Embodiment

Figure 10:
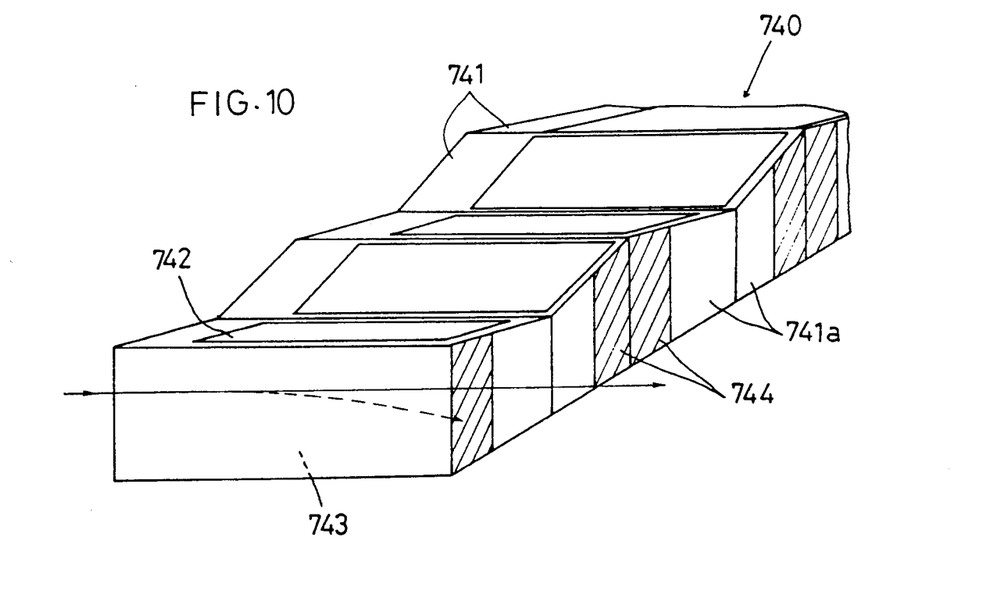

FIG. 10 shows a shutter array 740 comprising an elongate plate formed of a transparent material having an electro-optical effect such as PLZT, the plate defining a corrugated top. A plurality of conductive electrodes 742 and 743 are arranged on the inclined upper surfaces and opposite lower surfaces. A pair of upper and lower electrodes 742 and 743 constitutes a single light shutter 741. Each light shutter 741 has a light absorbing layer 744 formed on the part of an exit surface 741a adjacent the crest.

When a voltage is applied between the electrodes 742 and 743 of the light shutter 741, an electric field is formed inside the light shutter 741. This electric field is intense adjacent the trough, and progressively attenuates toward the crest where the electrodes 742 and 743 are wide apart. The light entering the light shutter 741 is deflected, as shown in a broken line in FIG. 10, toward the crest where the electrodes 742 and 743 are wide apart. The light is then absorbed by the light absorbing layer 744 disposed on the exit surface 741a.

Eighth Embodiment

Figure 11A:
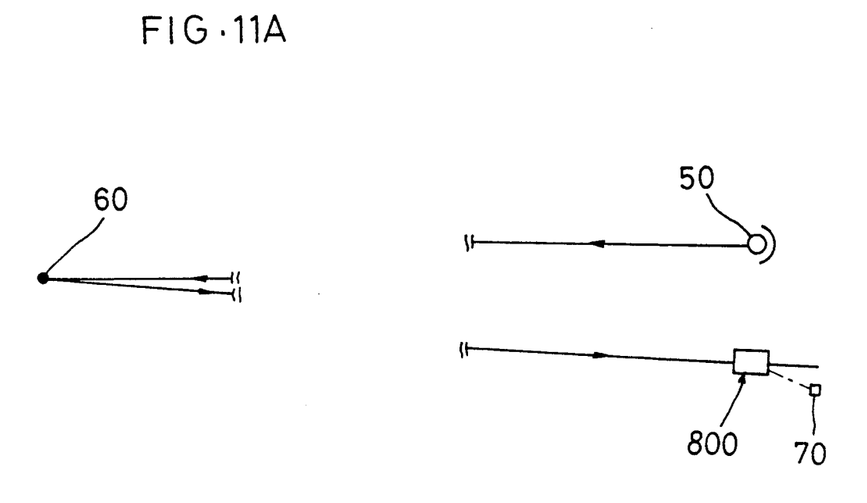
FIGS. 11A, 11B, 12A and 12B are schematic side views and perspective views showing an eighth embodiment of the invention utilizing a light deflecting device in a rangefinder.
Figure 11B:
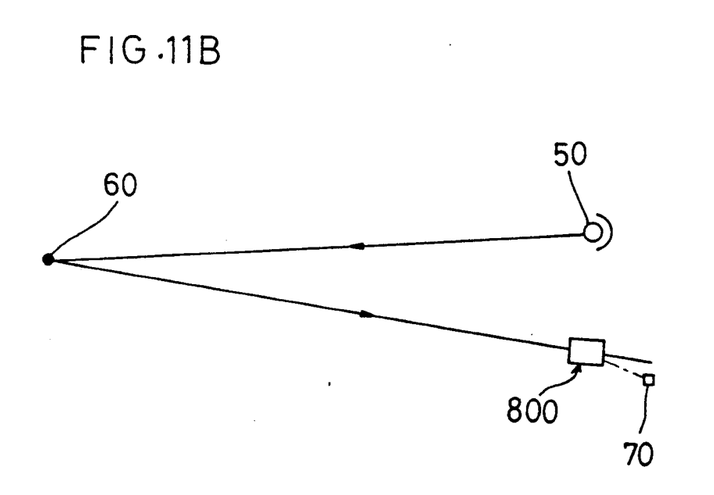

FIGS. 11A and 11B show a rangefinder utilizing a light deflecting device according to the present invention. In this rangefinder, light such as infrared radiation is projected from a light source 50 to an object 60. The distance to the object 60 is measured by using the light reflected from the object 60.

Figure 12A:
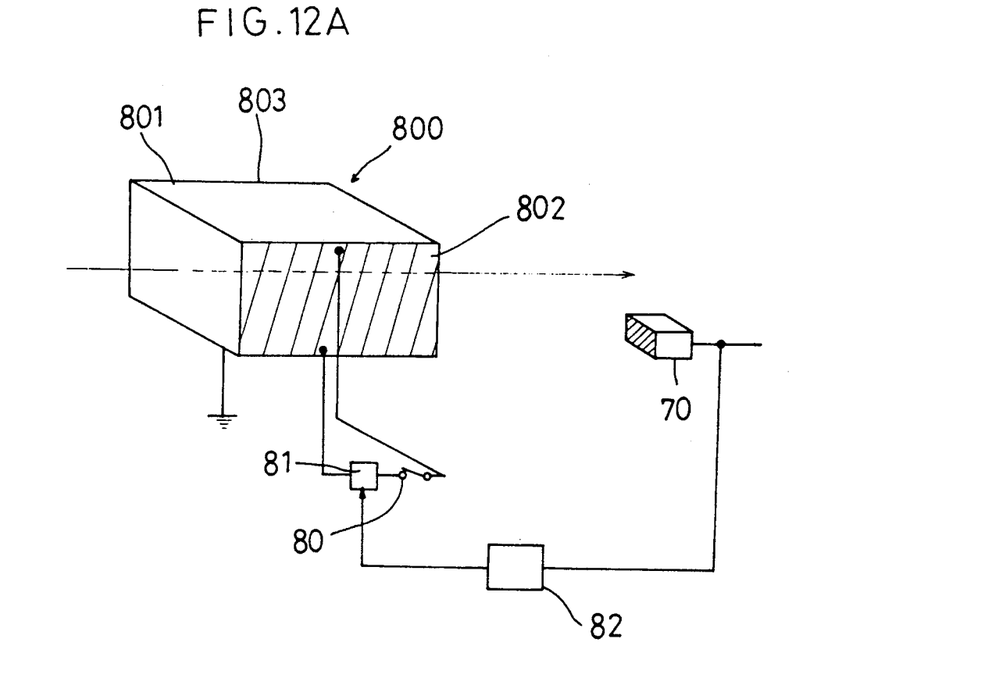
Figure 12B:
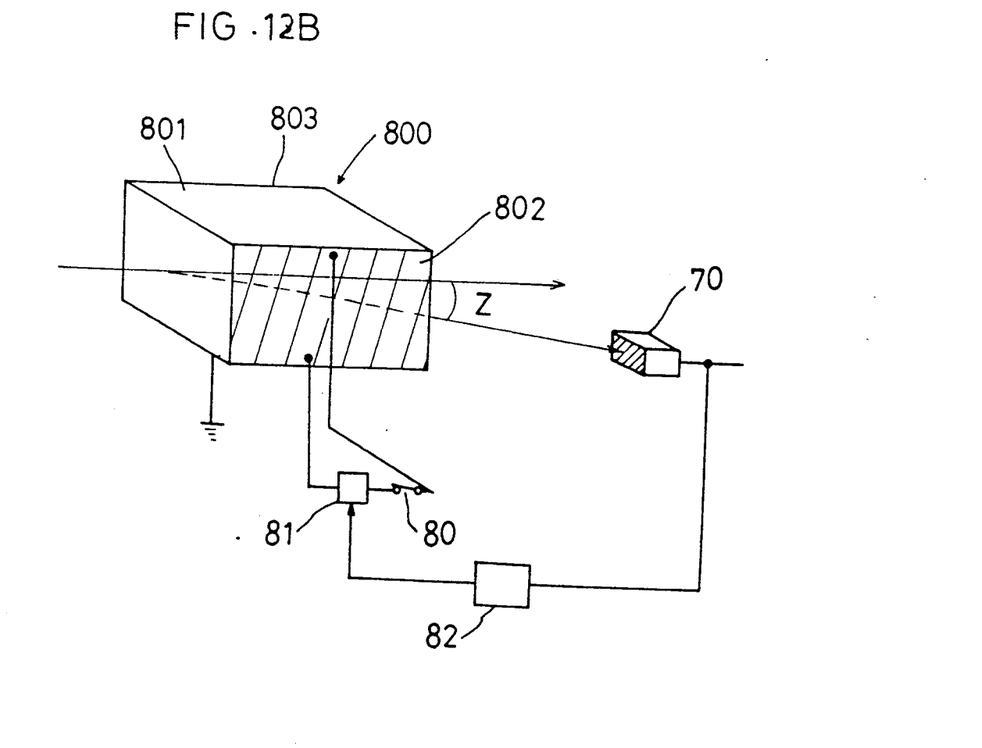

Referring to FIGS. 12A and 12B, this light deflecting device 800 comprises a transparent electro-optical element 801 in plate form as in the first embodiment shown in FIGS. 1 and 2. An electrode 802 having an electric resistance is mounted on the transparent element 801.

As shown in FIGS. 12A and 12B, a voltage is supplied by operating a switch 80 from a variable voltage source 81 to the electrode 802 on the light deflecting device 800. A light receiving element 70 is disposed at a slightly displaced position adjacent a light exit end of the light deflecting device 800. This light receiving element 70 is connected to a comparator 82.

The switch 80 is turned on when the light from the light source 50 is reflected by the object 60 to travel to the light deflecting device 800. Then the voltage is increasingly applied from the variable voltage source 81 to the electrode 802 of the light deflecting device 800, thereby forming an uneven electric field to deflect the light. As a result, the deflected light reaches the light receiving element 70. The output of the variable voltage source 81 is increased until the deflected light reaches the light receiving element 70.

Where the object 60 is at a remote position as shown in FIG. 11A, the light reflected by the object 60 enters the light deflecting device 800 substantially at right angles. In this case, the output of the variable voltage source 81 is increased in order to deflect the light to a great degree for guiding the light to the light receiving element 70.

Where the object 60 is located at a short distance as shown in FIG. 11B, the light enters the light deflecting device 800 at an angle. In this case, the light need not be deflected to a great degree, and the output of the voltage source 81 is decreased.

This rangefinder determines the distance to the object 60 by measuring the voltage output from the variable voltage source 81 that is required for deflecting device 800 to deflect the light to the light receiving element 70.

In the described rangefinder, the light receiving element 70 is disposed at a slightly displaced position adjacent the light exit end of the light deflecting device 800. Thus, the farther away the object 60 is located, the greater voltage application is made from the variable voltage source 81. Instead, the light receiving element 70 may be disposed adjacent the exit end and in a linear relationship with the light deflecting device 800. In this case, conversely, the nearer the object 60 is located, the greater voltage is applied from the variable voltage source 81.

Ninth Embodiment

Figure 13:
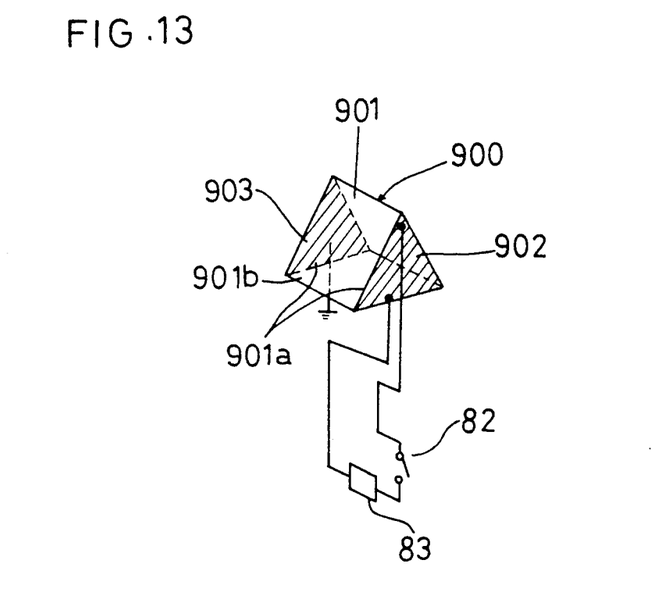
FIGS. 13 and 14 are a perspective view and a side view showing a ninth embodiment of the invention used in a color checker.
Figure 14:
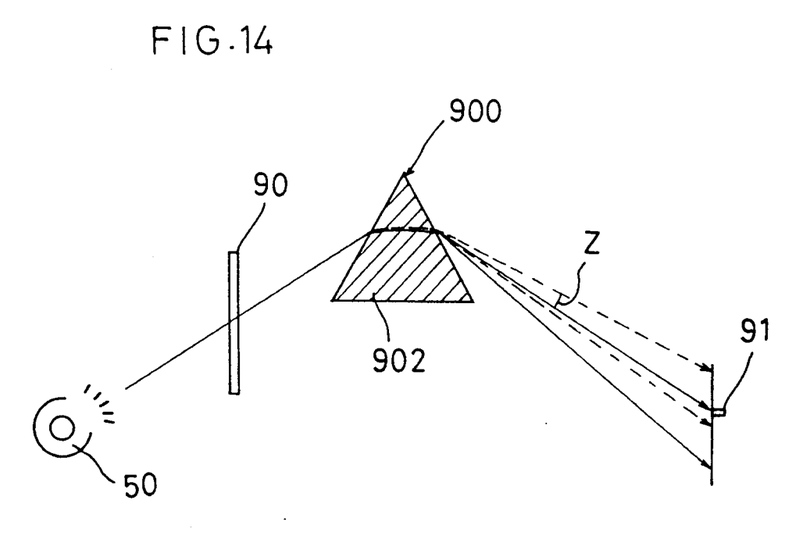

FIGS. 13 and 14 show a color checker utilizing a light deflecting device according to the present invention. This color checker is adapted to determine colors of light from a light source or reflected light.

The light deflecting device 900 comprises a prism-shaped transparent electro-optical element 901 formed of PLZT. Electrodes 902 and 903 are mounted on opposite triangular surfaces 901a and 901b of the electro-optical element 901 for forming an uneven electric field therein.

The light from the light source 50 is guided through a polarizer 90 to the prism-shaped light deflecting device 900. The light deflecting device 900 produces the spectrum of the incident light, and light of a particular color is directed from the light deflecting device 900 to a light receiving sensor 91 fixed at a selected position.

A voltage is not applied to the electrode 902 of the light deflecting device 900 when a switch 32 connected to a power source 83 is turned off as shown in FIG. 13. At this time, light in a visible light range exits the light deflecting device 900 in the spectrum as shown in solid lines in FIG. 14, with red light directed to the light receiving sensor 91.

When the voltage is applied from the power source 83 to the electrode 902 of the light deflecting device 900, the incident light is broken up into the spectrum and deflected by the uneven electric field. As a result, the deflected light in the visible light range exits the light deflecting device 900 as shown in broken lines in FIG. 14, with blue light directed to the light receiving sensor 91. Thus, the color received by the light receiving sensor 91 may be selected by controlling the voltage application. Since a mechanical drive is no longer necessary, the apparatus has a reduced size with increased precision.

In determining color components of light with this color checker, the single light receiving sensor 91 enables determination of the color components without necessitating a color filter as used in the prior art.

The light receiving sensor 91 of this color checker has low spectrum sensitivity characteristics, for use in detecting amounts of light of each color. This light receiving sensor 91 may be replaced with a color sensor having high spectrum sensitivity for measuring light of various colors.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light deflecting device comprising:
   a transparent member having an electro-optical effect which has spaced opposite parallel surfaces; and
   electric field generating means for generating an electric field which varies in a direction parallel to said opposite parallel surfaces inside said transparent member, said electric field generating means having a first electrode provided on one parallel surface and a second electrode provided on the other parallel surface to form the electric field therebetween and through said transparent member;
   wherein said electric field formed between the first and second electrodes varies a refractive index distribution inside said transparent member to deflect light entering said transparent member.

2. A light deflecting device as claimed in claim 1, wherein said first electrode is formed of a resistor with a voltage applied at one end thereof and grounded at the other end, and said second electrode is formed of a good conductor grounded.

3. A light deflecting device comprising:
   a transparent member having an electro-optical effect which has opposite non-parallel surfaces; and
   electric field generating means for generating an electric field which varies with a distance variation between said opposite non-parallel surfaces inside said transparent member, said electric field generating means having first and second electrodes provided on said opposite non-parallel surfaces, respectively, to form the electric field therebetween;
   wherein said electric field formed between the first and second electrodes varies a refractive index distribution inside said transparent member to deflect light entering said transparent member.

4. A light deflecting device as claimed in claim 3, wherein said first and second electrodes comprise good conductors, said first electrode being connected to a power source, and said second electrode being grounded.

5. A light deflecting device as claimed in claim 3, wherein said first electrode comprises a resistor with a voltage applied at one end thereof and grounded at the other end, and said second electrode comprises a good conductor grounded.

6. An optical printer for forming an image on a photoreceptor by selectively projecting light onto the photoreceptor, comprising:
   a light source; and
   light deflecting means for selectively deflecting light from the light source, said light deflecting means including a transparent member having an electro-optical effect, and a pair of electrodes provided on opposite surfaces of said transparent member, respectively, for forming an uneven electric field therebetween to vary a refractive index distribution inside said transparent member,
   wherein said light deflecting means operates based on an electric signal corresponding to an image to be formed on said photoreceptor.

7. An optical printer comprising:
   a light source;
   light deflecting means for selectively deflecting light received from said light source in response to an electric signal corresponding to an image to be formed, said light deflecting means including a transparent member having an electro-optical effect, and first and second electrodes provided on opposite surfaces of said transparent member, respectively, for forming an uneven electric field therebetween to vary a refractive index distribution inside said transparent member;
   a photoreceptor on which the image is formed by light projected thereon; and
   light blocking means for blocking light deflected by said light deflecting means.

8. An optical printer as claimed in claim 7, wherein said transparent member has a substantially triangular prism shape with said first and second electrodes provided on first and second side surfaces of said transparent member, respectively, so that light entering said transparent member through a third side surface thereof is reflected by said first and second side surfaces to exit through said third side surface.

9. An optical printer as claimed in claim 7 wherein said light blocking means comprises a slit.

10. An optical printer as claimed in claim 7, wherein said transparent member has a substantially rectangular parallelpiped shape with said first electrode arranged on one elongated surface thereof and said second electrode arranged on an opposite elongated surface thereof, said first electrode being formed of a resistor with a voltage applied at one end thereof and grounded at the other end, said second electrode being formed of a good conductor and grounded.

11. An optical printer as claimed in claim 10, wherein said light blocking means comprises a light absorbing layer disposed on said transparent member for absorbing the deflected light.

12. An optical printer as claimed in claim 7, wherein said transparent member has a sloping top surface and a bottom surface opposed to said sloping top surface, said first electrode being provided on said sloping top surface, said second electrode being provided on said bottom surface so that said first and second electrodes are arranged in a nonparallel relationship.

13. An optical printer as claimed in claim 12, wherein said light blocking means comprises a light absorbing layer disposed on said transparent member for absorbing the deflected light.

14. An optical printer as claimed in claim 12, wherein said transparent member comprises a serrated top portion having a plurality of said sloping top surface on which a plurality of said first electrodes are provided, respectively.

15. An optical printer as claimed in claim 12, wherein said transparent member comprises a corrugated top portion having a plurality of said sloping top surfaces on which a plurality of said first electrodes are provided, respectively.

16. An electro-optical light deflecting device comprising:
a transparent member having a light incident surface and a light exiting surface with side surfaces extending between the incident and exiting surfaces, the transparent material capable of providing an electro-optical effect on the transmission of light, and
an electrical field generating means for providing an electrical field variance to vary the index of refraction of the transparent member, including a pair of first and second electrodes, each one provided on respective side surfaces of the transparent member, the first electrode providing a conductive path, while the second electrode provides a significantly varying resistance along its path relative to the first electrode, whereby the index of refraction will vary between the respective electrode paths upon generation of an electrical field which varies between the electrodes in correspondence to a distance from an upper surface to a lower surface of the transparent member.

17. An electro-optical light deflecting device for use in an optical printing head comprising:
a transparent member having a light incident surface and a light exiting surface with non-parallel side surfaces extending between the incident and exiting surfaces, the transparent material capable of providing an electro-optical effect on the transmission of light, and
an electrical field generating means for providing an electrical field variance to vary the index of refraction of the transparent member, including a pair of electrodes, each one provided on respective non-parallel side surfaces of the transparent member, one electrode providing a conductive path, while the other provides a varying resistance along its path, whereby the index of refraction will vary between the respective electrode paths upon generation of an electrical field which varies between the electrodes in correspondence to distance between the side surfaces supporting the electrodes.

* * * * *